United States Patent
Albers (10) Patent No.: US 11,654,754 B2
(45) Date of Patent: May 23, 2023

(54) PANEL AND OPEN ROOF CONSTRUCTION PROVIDED THEREWITH

(71) Applicant: Inalfa Roof Systems Group B.V., Oostrum (NL)

(72) Inventor: Thomas Anton Martijnszoon Albers, Venray (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 8 days.

(21) Appl. No.: 17/377,044

(22) Filed: Jul. 15, 2021

(65) Prior Publication Data

US 2022/0024284 A1 Jan. 27, 2022

(30) Foreign Application Priority Data

Jul. 27, 2020 (EP) .................................... 20187987

(51) Int. Cl.
- *B60J 7/04* (2006.01)
- *B60J 7/043* (2006.01)
- *B60J 1/00* (2006.01)

(52) U.S. Cl.
CPC .............. *B60J 7/04* (2013.01); *B60J 7/0435* (2013.01); *B60J 1/006* (2013.01)

(58) Field of Classification Search
CPC ... B60J 7/04; B60J 7/0435; B60J 7/047; B60J 7/02; B60J 7/024
USPC ........................................ 296/216.06–216.9
See application file for complete search history.

(56) References Cited

U.S. PATENT DOCUMENTS

| 5,046,779 | A | 9/1991 | Ichinose et al. |
| 6,079,771 | A * | 6/2000 | Brandner ............. B60J 10/82 49/27 |
| 7,828,376 | B2 | 11/2010 | Nellen |
| 7,878,581 | B2 | 2/2011 | Faerber et al. |

(Continued)

FOREIGN PATENT DOCUMENTS

| DE | 3532679 C | * 11/1986 | .............. B60J 7/053 |
| DE | 3532679 C1 | 11/1986 | |

(Continued)

OTHER PUBLICATIONS

European Search Report for corresponding European Patent Application No. 120187987.1 dated Dec. 11, 2020.

*Primary Examiner* — Dennis H Pedder
(74) *Attorney, Agent, or Firm* — Steven M. Koehler; Westman, Champlin & Koehler, P.A.

(57) ABSTRACT

A panel for use in an open roof construction for a vehicle comprises a substantially rectangular panel main body made of transparent material, and at least one elongated reinforcing bracket positioned at least partly in the vicinity of an edge of said panel main body and firmly connected thereto. The panel bracket is made of a material which is thinner than that of the material of the panel main body and includes a structure to fix the reinforcing bracket to an operating mechanism configured to support the panel and control movements thereof. The edge of the panel main body comprises at least an inward recess and the reinforcing bracket comprises at least an upward step into the recess. The upward step extends along at least a portion of the recess and is dimensioned to accommodate a part of the operating mechanism under it.

20 Claims, 8 Drawing Sheets

(56) References Cited

U.S. PATENT DOCUMENTS

| | | | |
|---|---|---|---|
| 8,100,468 B2 * | 1/2012 | Uehara | B60J 10/25 |
| | | | 296/216.09 |
| 8,668,256 B2 * | 3/2014 | De Bie | B29C 45/14836 |
| | | | 296/216.09 |
| 8,857,903 B2 | 10/2014 | Nellen et al. | |
| 10,214,086 B2 * | 2/2019 | Kono | B60J 10/82 |
| 11,247,547 B2 * | 2/2022 | Schröferl | B60J 10/90 |
| 2007/0114817 A1 | 5/2007 | Becher et al. | |
| 2009/0179462 A1 | 7/2009 | Nellen | |

FOREIGN PATENT DOCUMENTS

| | | | | |
|---|---|---|---|---|
| EP | 1026022 A2 * | 8/2000 | | B60J 10/18 |
| EP | 1026022 A2 | 8/2000 | | |
| EP | 1741588 A1 | 1/2007 | | |
| EP | 1790515 A1 | 5/2007 | | |
| JP | 04113925 A * | 4/1992 | | |

\* cited by examiner

PANEL AND OPEN ROOF CONSTRUCTION PROVIDED THEREWITH

BACKGROUND

The discussion below is merely provided for general background information and is not intended to be used as an aid in determining the scope of the claimed subject matter.

The invention concerns a panel and an open roof construction having a panel.

Such panel and open roof construction are known. One solution to create space in a Z-direction (upward direction) at the edge of the panel is by making a center panel from glass and a completely surrounding panel body from sheet metal.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to an aspect of the invention, said edge of the panel main body comprises at least an inward recess and the reinforcing bracket comprises at least an upward step into the recess, said upward step extending along at least a portion of the recess and being dimensioned to accommodate a part of the operating mechanism.

By only making a recess at the relevant edges of the panel the non-glass outer surface can be kept to a minimum.

In case the panel is surrounded by encapsulation material, said encapsulation material preferably covers the reinforcing bracket at the position of the recess in the panel main body. This will hardly influence the appearance of the roof panel.

In one embodiment, the reinforcing bracket supports the encapsulation material at least partly at the position of the recess in the panel main body.

The encapsulation material will thus not only cover the reinforcing bracket but will also be supported by the reinforcing bracket, so that the encapsulation material will have a stable shape over a longer period of time.

In a simple embodiment the upward step is formed by at least one lip extending away from a remainder of the reinforcing bracket. The reinforcing bracket may be provided with an opening at the position of the recess in the panel, for example formed by two spaced lips, the opening being smaller than the recess and being at least partly filled with encapsulation material.

This embodiment is especially convenient if the reinforcing bracket is made of sheet metal bent into the desired shape. If one or more openings are present, the layer of encapsulation material there may be thinner than the combined thickness of the lip and the encapsulation material, so that parts of the operating mechanism may be placed even closer to the upper surface of the panel at the openings between lips.

Although the reinforcing bracket may be fixed to the lower side of the panel main body by glue, it may be preferable to fix the reinforcing bracket to the lower side of the panel main body by the encapsulation material. No additional fixing members are required then.

In one embodiment the reinforcing bracket is at least partly free from encapsulation material at a lower side of the reinforcement bracket turned away from the panel main body, at least at the position where the reinforcing bracket has the structure to fix the reinforcing bracket to the operating mechanism.

This provides more room for any tools used for fixing members to fix the reinforcing bracket to the operating mechanism.

The recess in the panel main body is preferably shaped with roundings having a radius of at least about 75 to about 100 mm, when seen in plan view on the panel. This avoids any stresses in tight corners of the panel.

In one embodiment the inward recess in the edge of the panel main body is spaced from at least one of the two adjacent edges of the panel main body, but in an alternative embodiment the inward recess may extend along the whole edge of the panel main body. In both embodiments the inward recess is conveniently provided only on each of two opposite edges of the panel main body. This minimizes the surface area of the recesses. The shape of the recesses may be chosen either to minimize surface area and/or to provide pleasant esthetics.

An aspect of the invention also includes an open roof construction for a vehicle having a roof opening in a fixed roof of the vehicle, comprising one or more panels as described above. In such open roof construction, the structure to fix the reinforcing bracket to the operating mechanism extends at the position of the recess up to a level of the reinforcing bracket where the reinforcing bracket is connected to the panel main body. Such structure may be formed by a panel bracket.

If the operating mechanism thereof includes a front support and a rear support configured to move at least the rear edge of the panel in a vertical direction, the inward recess of the panel main body may be made at least at the position of the rear support as this part often needs most space in Z-direction. Such rear support may for example comprise a rotatable element, such as a lever, having an upper pivot fixed relative to the panel at the position of the recess in the panel.

If the open roof construction comprises a front panel and a rear panel, each may comprise an inward recess, such that the recess in the front panel is open to and adjacent to the recess in the rear panel. This creates an optical unit between both panels.

BRIEF DESCRIPTION OF THE DRAWINGS

Further details and advantages follow from the below description with reference to the drawing in which.

DETAILED DESCRIPTION OF THE ILLUSTRATIVE EMBODIMENTS

Figure 1A:
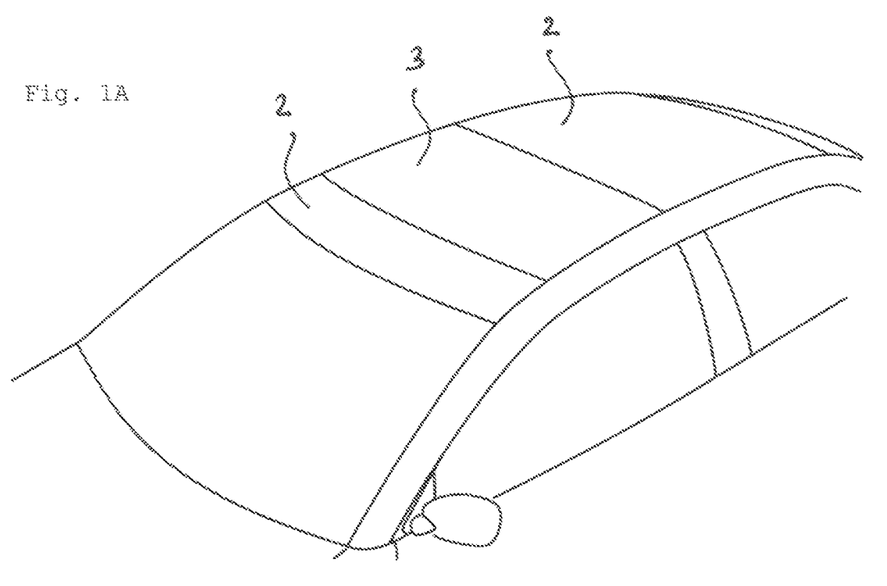
FIGS. 1A and 1B are perspective views of a vehicle roof having an open roof construction including a panel, shown in closed and open position.
Figure 1B:
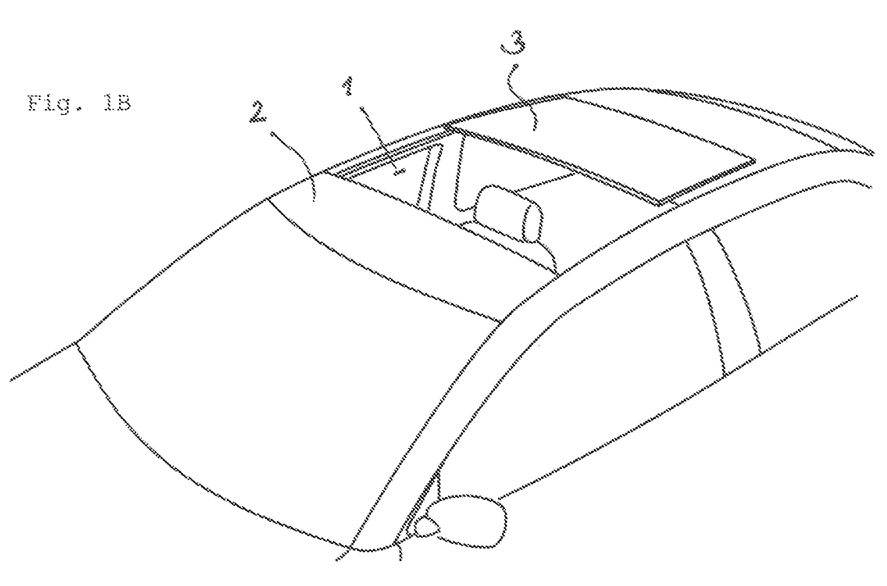

Firstly referring to FIGS. 1A and 1B, an example is illustrated of a vehicle, such as a passenger car, having an open roof construction. Said open roof construction is for opening and closing at least one roof opening 1 in a stationary roof part 2 of the vehicle and includes at least one movable panel, in particular a rigid, at least partly (semi) transparent panel 3 which, by means not illustrated in detail but known per se, can be moved for opening and closing said roof opening 1. Commonly, as is known, movable panel 3 is guided in longitudinal guides mounted to or formed in stationary roof part 2 along longitudinal sides of roof opening 1. A user operated device such as a motor or crank (not illustrated) is operably coupled to panel 3 via cables or the like and an operating mechanism to move panel 3 selectively between its open and closed positions. In FIG. 1*a* closure panel 3 has been illustrated in a position in which it closes roof opening 1 and in FIG. 1*a* it opens roof opening 1 by being moved upwardly and rearwardly above stationary roof part 2. The invention can be used for all types of open roof constructions comprising one or more panels.

The panel 3 comprises a panel main body 4, in particular made of glass or plastic to reduce the weight of panel 3.

In order to increase the rigidity of panel 3 and thereby reduce deformation of the panel under load, panel 3 is provided with a reinforcement assembly made up of one or more reinforcing brackets 5 attached to the lower side of panel main body 4, here at least two reinforcing brackets 5 along the longitudinal sides of panel main body 4.

Figures 3A, 4A, 5A:
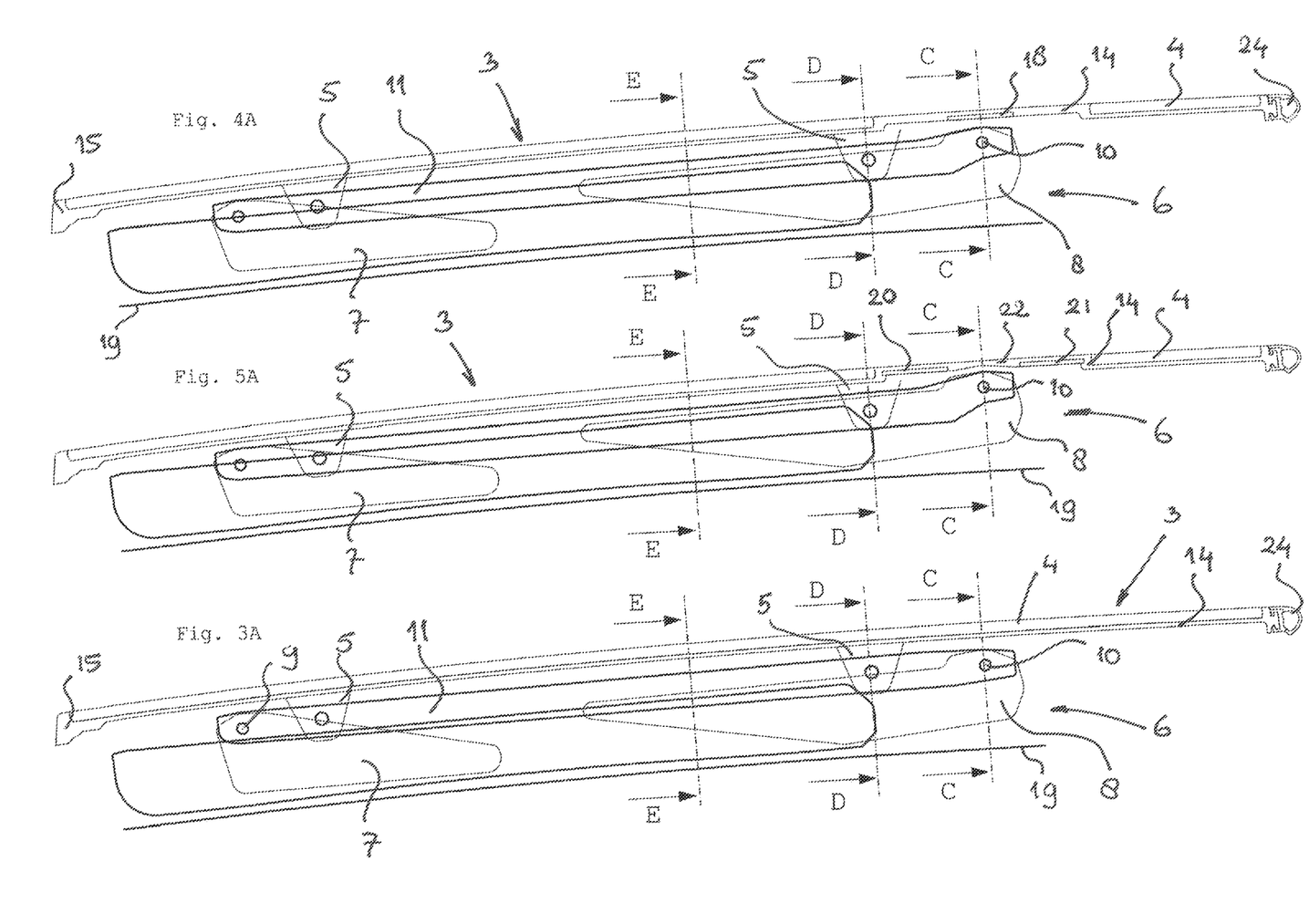
FIG. 3A is a sectional side view of a panel and its operating mechanism according to the prior art.
FIG. 4A is a view corresponding to that of FIG. 3A and according to the lines IV A-IV A in FIG. 2A, but showing a first embodiment of the invention.
FIG. 5A-5E are views corresponding to those of FIGS. 4A-4E, but showing a second embodiment of the invention.

FIGS. 3A-3E show a panel 3 and reinforcing bracket 5 according to the prior art. FIG. 3A shows panel 3 being movably supported by an operating mechanism 6. The operating mechanism 6 is very schematically illustrated, but may for example be constructed such as disclosed in U.S. Pat. No. 8,857,903, the contents of which are incorporated herein by reference thereto. A front lever 7 and a rear lever 8 of the operating mechanism 6 are pivotally connected through a pivot 9, 10, respectively, to a panel bracket 11 used to attach the operating mechanism 6 to panel 3, in particular to reinforcing bracket 5 thereof. Reinforcing bracket 5 and panel bracket being plate-shaped parts formed with bends and tabs, preferably formed from thick, bent sheet metal, in particular steel.

Figures 3B, 4B, 5B:
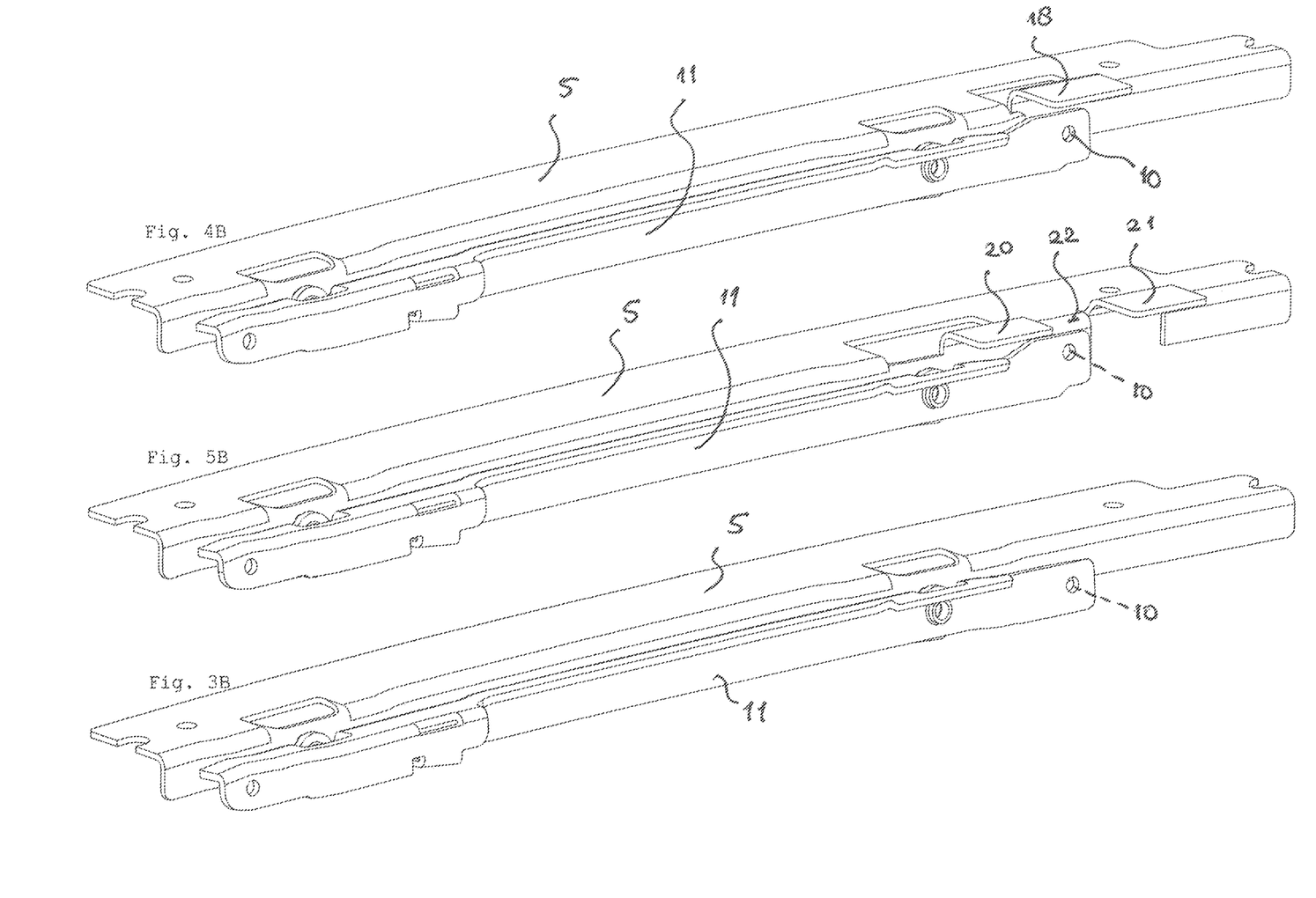
FIG. 3B is a perspective view of a reinforcing bracket and panel bracket according to the prior art.
FIG. 4B-4E are views corresponding to that of FIGS. 3B-3E, but also showing the first embodiment of the panel of the invention.
Figure 3C:
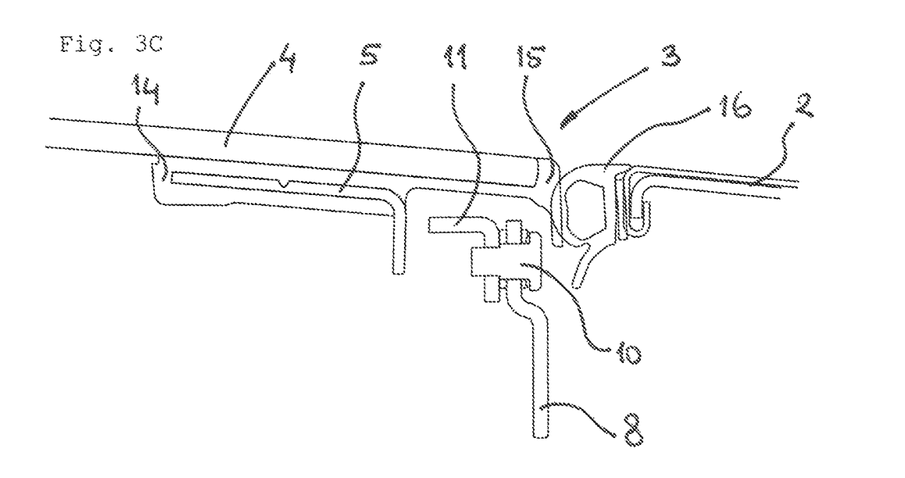
FIGS. 3C, 3D and 3E are sectional views according to the lines C-C, D-D and E-E in FIG. 3A, on a larger scale.
Figure 3D:
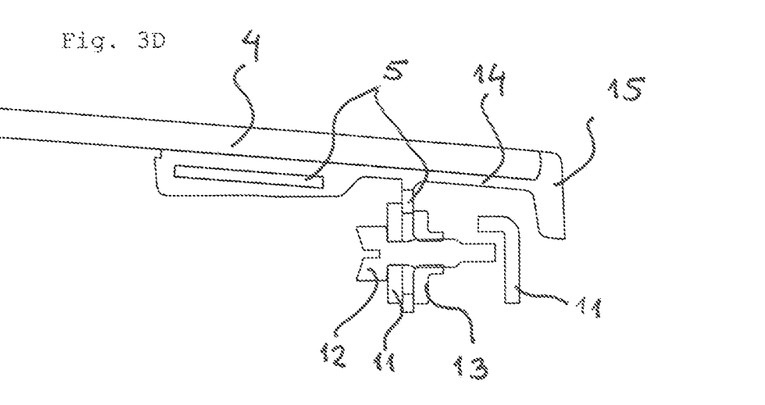

FIGS. 3B and 3C show pivot 10 between lever 8 and panel bracket 11, and FIG. 3D shows the attachment between panel bracket 11 and reinforcing bracket 5 by a screw 12 and nut 13.

Figure 3E:
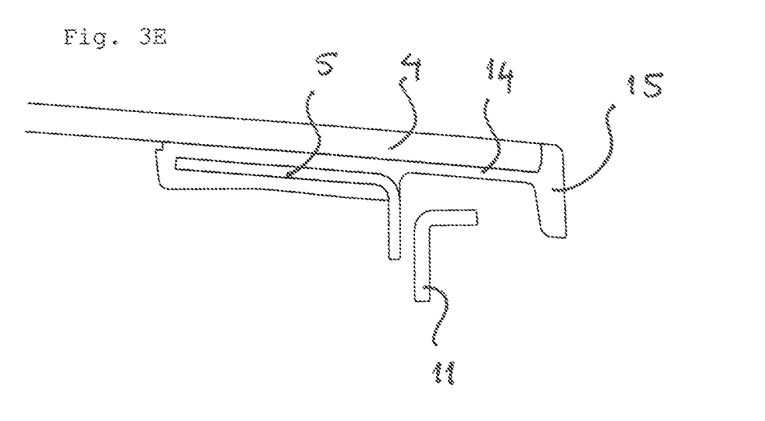

FIGS. 3C, 3D and 3E further show that reinforcing bracket 5 is attached to panel main body 4 by encapsulating material 14, such as PU, which is molded around reinforcing bracket 5 and to the lower side of panel main body 4. An outer edge 15 of the encapsulating material 14 is provided to carry a panel seal 24 (FIG. 3A at the rear edge towards panel 3') or to cooperate with a body seal 16.

Figure 4C:
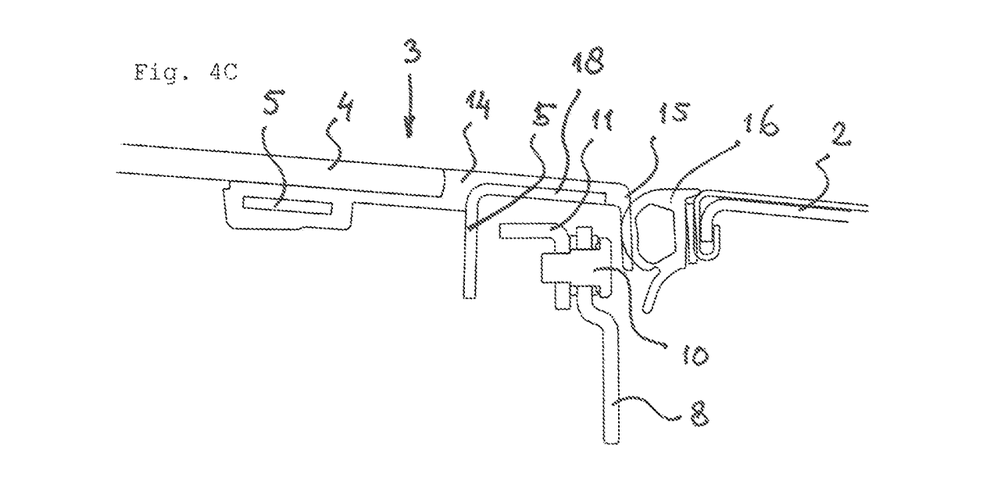
Figure 4D:
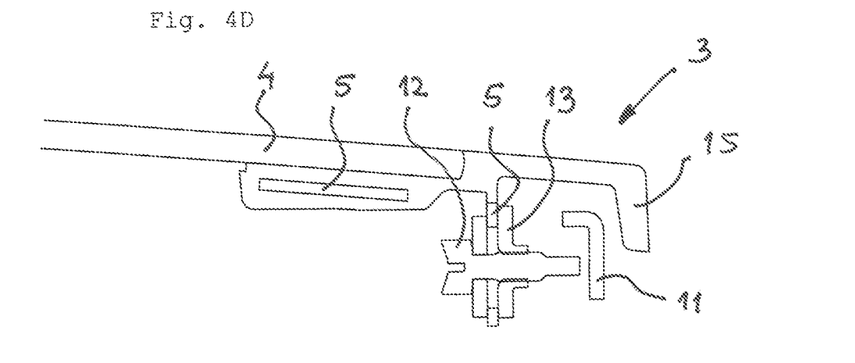
Figure 4E:
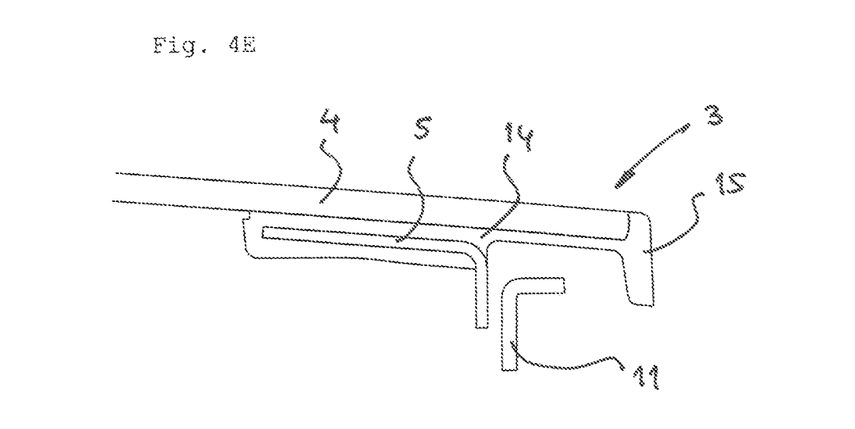
Figure 5C:
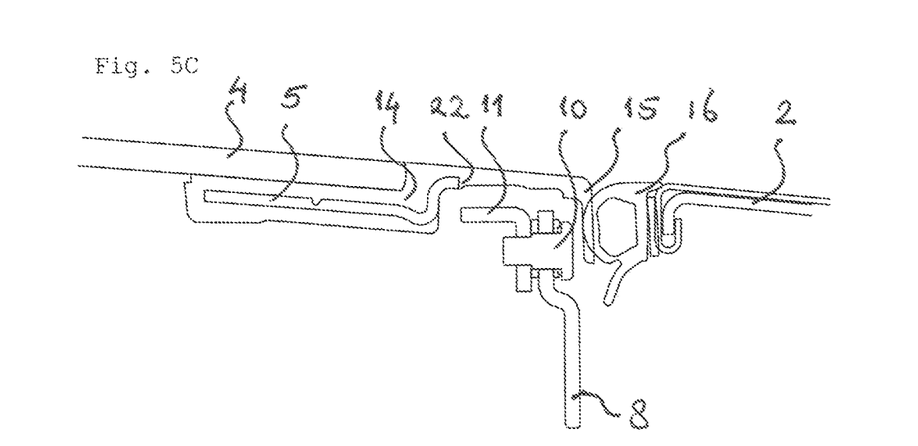
Figure 5D:
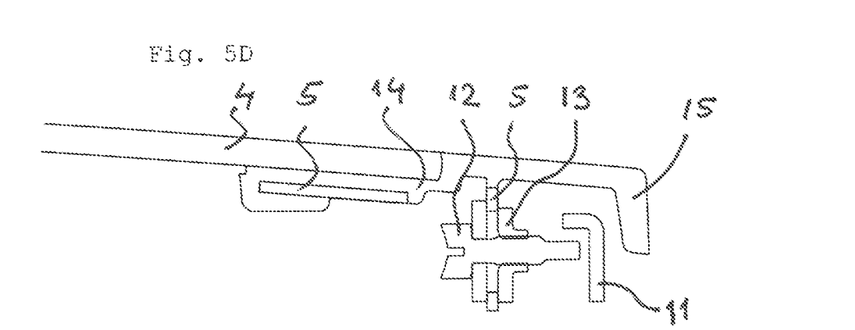
Figure 5E:
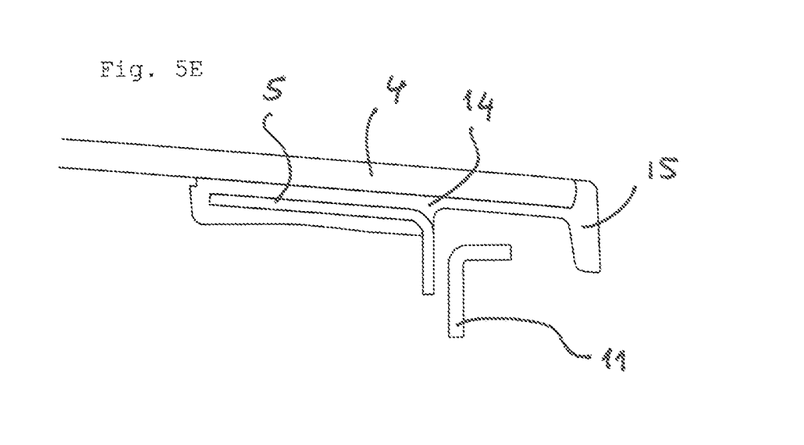
Figure 6:
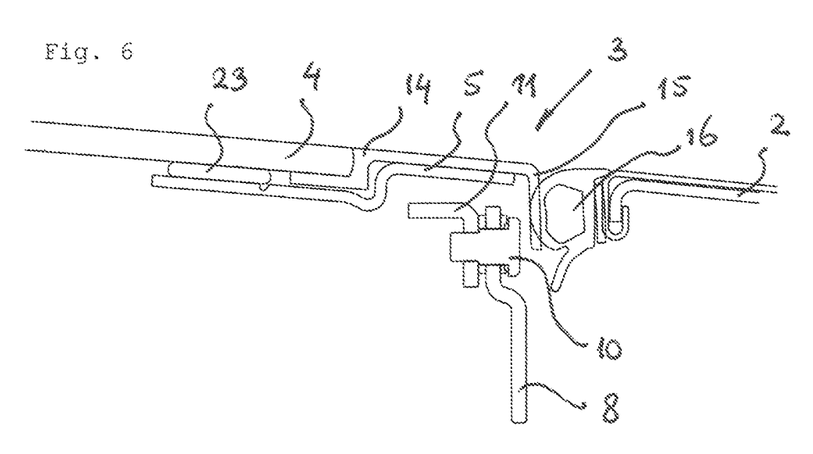
FIG. 6 is a view corresponding to that of FIG. 4C, but showing still a further embodiment of the invention.

FIGS. 4-6 show embodiments of the panel and open roof construction according to the invention. In order to reduce the Z-package (in vertical direction) of the open roof construction or to improve the characteristics of moving parts of the operating mechanism, such as levers thereof, it would be favorable to position parts of operating mechanism 6 as close as possible to the upper side of panel 3, in this case especially pivot 10 between rear lever 8 and panel bracket 11.

Figure 2A:
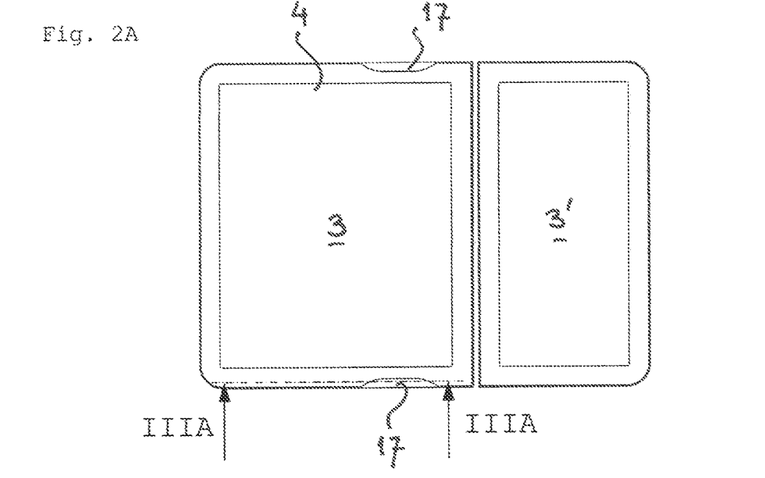
FIGS. 2A, 2B and 2C are plan views of three embodiments of a panel according to the invention.

FIGS. 2A and 4A-4E show a first embodiment of the panel and open roof construction, in this case having a front movable panel 3 and a rear fixed panel 3'. FIG. 2A shows that the opposite longitudinal side edges of panel main body 4 of panel 3 each comprise at least an inward recess 17 (an additional recess may e.g. be present to the front/left of the panel). The recess 17 in this case is positioned in the area of pivot 10 of rear lever 8 as is shown in FIG. 4C. This figure shows that panel main body 4 ends inwardly of outer edge 15 of encapsulating material 14. Reinforcing bracket 5 is shaped such that a lip 18 is bent out of the remainder of bracket 5 to form an upward step into recess 17, see FIG. 4B. To hide lip 18 from above, encapsulating material 14 is molded to fill recess 17 above lip 18 (FIG. 4C). Lip 18 is positioned as high as possible to create room below it on the one hand, but to enable a sufficient layer of encapsulating material 14 above it on the other hand, such that the upper surface of panel main body 4 is flush with upper surface of encapsulating material 14 within recess 17. As the encapsulating material is supported by lip 18, the layer keeps its shape despite its small thickness. Outside lip 18, the layer of encapsulating material 14 is thicker and therefore sufficiently stable. Because the thickness of lip 18 of a material like metal, in particular steel, can be smaller than that of glass or plastic of panel main body 4 a few millimeters of height can be won at the position of pivot 10. FIG. 4C shows that pivot 10 in this embodiment is indeed positioned at a higher level with respect to panel 3 than pivot 10 in FIG. 3C according to the prior art. In fact, in FIG. 4C it can be seen that panel bracket 11 at the position where pivot 10 is connected to it is at a level which is substantially the same as the level of panel bracket 5 at the position where it is connected to panel main body 4, i.e. on the left side of FIG. 4C. (In FIG. 3C panel bracket 11 is at a lower level than left portion of reinforcing bracket 5) This enables improvement of the open roof construction. First, one can position panel 3 closer to a frame of the open roof construction represented by line 19 in FIG. 4A, thereby reducing the Z-package. On the other hand, the extra space can be used to redesign lever 8 and/or its guiding elements to create more lift and/or to create more stability in open positions of panel 3.

The recess 17 in the panel main body 4 is shaped with roundings having a radius of at least 75-100 mm, when seen in plan view on the panel. This is to avoid thermal or other stresses along recess 17.

FIGS. 5A-5E show a second embodiment of panel 3. FIGS. 5A and 5B clearly show that recess 17 is longer and is also present at the position of screw and nut 12, 13 to attach panel bracket 11 to reinforcing bracket 5. The encapsulation material 14 at the position of recess 17 is now supported by two lips 20, 21 which are spaced from each other, so that there is an opening 22 between them. This opening is partly filled with encapsulation material 14 such that the thickness of the encapsulation material 14 in opening 22 is smaller than the combined thickness of lips 20, 21 and overlying encapsulation material 14. Therefore, pivot 10 can be positioned even closer to the upper side of panel 3.

In this embodiment, also screw 12 can be positioned closer to the upper side of panel 3. To allow screw 12 to be inserted and tightened by a tool (not shown), the encapsulation material 14 is locally removed at the lower side of reinforcing bracket 5, as is shown in FIG. 5D.

FIG. 6 shows another embodiment of the panel in which reinforcing bracket 5 is not fixed to panel main body 4 by encapsulation material but by glue 23. Encapsulation material 14 is only used to cover the outside of panel main body by edge 15 and to cover lip 18 (not indicated in FIG. 6, but denoted by 5) of reinforcing bracket 5 in recess 17 (also not indicated in FIG. 6).

Figure 2B:
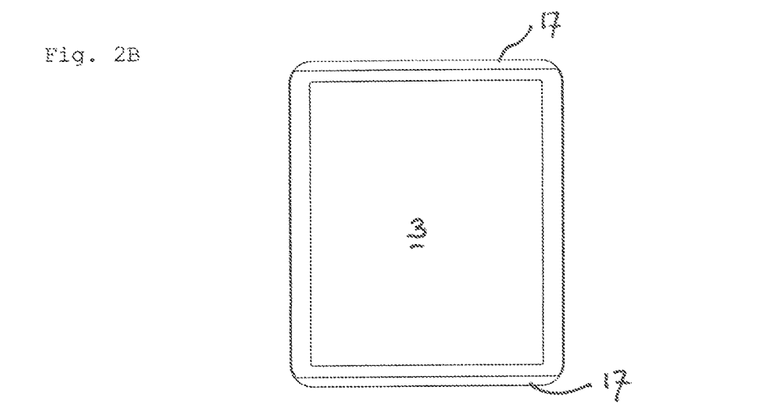
Figure 2C:
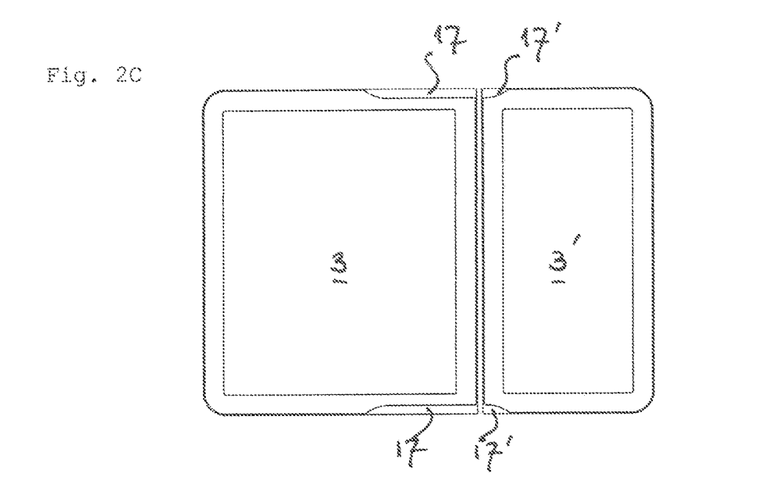

FIGS. 2B and 2C show variations of panel 3 with respect to the shape and position of recess 17. In FIG. 2B, recess 17 extends along the whole longitudinal side edge of panel main body 4. Reinforcing bracket 5 will be shaped such that there will be sufficient lips 20, 21 along the whole length of reinforcing bracket to support encapsulation material 14.

In FIG. 2C the open roof construction comprises a (movable) front panel 3 and a (movable or fixed) rear panel 3'. Each of panels 3, 3' comprises an inward recess 17, 17', such that recess 17 in front panel 3 is open to and adjacent to recess 17' in rear panel 3'. The connecting recesses 17, 17' create a uniting effect between both panels 17, 17', while recess 17' in rear panel 3' may also create room for a part of an operating mechanism under rear panel 3' in case this is adjustable at the front side, for example to move the front side downwardly to enable front panel 3 to slide further rearwardly.

From the foregoing it follows that the invention provides an open roof construction and panel for use therein, which enables a reduced panel thickness at desired locations above the operating mechanism to lower the total Z-package or improve operating mechanics of the operating mechanism.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims and embodiments are herewith disclosed.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A panel for use in an open roof construction for a vehicle, comprising:
a substantially rectangular panel main body made of transparent material and having four edges, and at least one elongated reinforcing bracket positioned at least partly in a vicinity of at least one of the four edges of said panel main body and firmly connected thereto, said reinforcing bracket being made of a material which is thinner than that of the transparent material of the panel main body and including a structure to fix the reinforcing bracket to an operating mechanism configured to support the panel and control movements thereof; and
wherein said at least one of the four edges of the panel main body comprises at least an inward recess which is spaced from at least one of two adjacent edges of the panel main body, and the reinforcing bracket comprises at least an upward step into the recess, said upward step extending along at least a portion of the recess and being dimensioned to accommodate a part of the operating mechanism under it.

2. The panel of claim 1, wherein the panel is surrounded by encapsulation material, said encapsulation material covering the reinforcing bracket at a position of the recess in the panel main body.

3. The panel of claim 2, wherein the reinforcing bracket supports the encapsulation material at least partly at the position of the recess in the panel main body.

4. The panel of claim 3, wherein the upward step is formed by at least one lip extending away from a remainder of the reinforcing bracket.

5. The panel of claim 3, wherein the reinforcing bracket is provided with an opening at the position of the recess in the panel main body, formed by at least two spaced lips, the opening being smaller than the recess and being at least partly filled with the encapsulation material.

6. The panel of claim 1, wherein the reinforcing bracket is fixed to a lower side of the panel main body by an encapsulation material.

7. The panel of claim 6, wherein the reinforcing bracket is at least partly free from the encapsulation material at a lower side of the reinforcing bracket turned away from the panel main body, at least at a position where the reinforcing bracket has the structure to fix the reinforcing bracket to the operating mechanism.

8. The panel of any of claim 1, wherein the reinforcing bracket is fixed to a lower side of the panel main body by glue.

9. The panel of claim 1, wherein the recess in the panel main body is shaped with roundings having a radius of at least about 75 mm opening toward at least one of the two adjacent edges, when seen in plan view on the panel.

10. The panel of claim 1, wherein the recess in the at least one of the four edges of the panel main body is spaced from both of the two adjacent edges of the panel main body.

11. The panel of claim 1, wherein the recess is provided only on each of two opposite edges of the panel main body.

12. An open roof construction for a vehicle having a roof opening in a fixed roof of the vehicle, comprising:
a panel including a substantially rectangular panel main body made of transparent material, said panel being movable between a closed position closing the roof opening and an open position at least partly opening said roof opening;
an operating mechanism on at least one side of the panel configured to be fixed to the panel in order to support the panel and control movements thereof;
said panel further comprising at least one elongated reinforcing bracket positioned at least partly in a vicinity of an edge of said panel main body and firmly connected thereto, said reinforcing bracket being made of a material which is thinner than that of the material of the panel main body and including a structure to fix the reinforcing bracket to the operating mechanism; and wherein said edge of the panel main body comprises at least an inward recess and the reinforcing bracket comprises at least an upward step into the recess, said upward step extending along at least a portion of the recess and being dimensioned to accommodate a part of the operating mechanism under the upward step, such that the structure to fix the reinforcing bracket to the operating mechanism extends at a position of the recess up to a level of the reinforcing bracket where the reinforcing bracket is connected to the panel main body.

13. The open roof construction of claim 12, wherein the operating mechanism includes a front support and a rear support configured to move at least a rear edge of the panel in a vertical direction, the recess of the panel main body being made at least at a position of the rear support.

14. The open roof construction of claim 13, wherein the rear support comprises a rotatable element having an upper pivot fixed relative to the panel at a position of the recess in the panel.

15. The open roof construction of claim 14 wherein the rotatable element comprises a lever.

16. The open roof construction of claim 12, and further comprising a second panel behind the first-mentioned panel, the second panel comprising a second inward recess along an edge thereof, such that the recess in the first-mentioned panel is open to and adjacent to the second recess in the second panel.

17. The open roof construction of claim 12, wherein the recess extends along the whole edge of the panel main body.

18. The open roof construction of claim 12, wherein the recess in the edge of the panel main body is spaced from at least one of two adjacent edges of the panel main body.

19. The open roof construction of claim 12, wherein the reinforcing bracket is adhered to a lower side of the panel main body by encapsulation material and/or glue.

20. The open roof construction of claim 12, wherein the structure to fix the reinforcing bracket to the operating mechanism is formed by a panel bracket.

* * * * *